(12) United States Patent
Sabatka et al.

(10) Patent No.: US 10,824,778 B2
(45) Date of Patent: Nov. 3, 2020

(54) COMPUTER-IMPLEMENTED METHOD FOR SIMULATING BEHAVIOR OF A SCREW CONNECTION BETWEEN METAL COMPONENTS OF ENGINEERING STRUCTURES

(71) Applicant: IDEA RS S.R.O., Brno (CZ)

(72) Inventors: Lubomir Sabatka, Brno (CZ); Jaromir Kabelac, Brno (CZ); Drahoslav Kolaja, Brno (CZ); Martin Pospisil, Brno (CZ)

(73) Assignee: Idea Statica s.r.o., Brno-Kralovo Pole (CZ)

( * ) Notice: Subject to any disclaimer, the term of this patent is extended or adjusted under 35 U.S.C. 154(b) by 86 days.

(21) Appl. No.: 15/303,614

(22) PCT Filed: Apr. 10, 2015

(86) PCT No.: PCT/CZ2015/000035
§ 371 (c)(1),
(2) Date: Oct. 12, 2016

(87) PCT Pub. No.: WO2015/158315
PCT Pub. Date: Oct. 22, 2015

(65) Prior Publication Data
US 2017/0032069 A1    Feb. 2, 2017

(30) Foreign Application Priority Data

Apr. 14, 2014    (CZ) ..................... 2014-249

(51) Int. Cl.
*G06F 30/23*    (2020.01)
*G06F 30/17*    (2020.01)
*G06F 111/10*   (2020.01)

(52) U.S. Cl.
CPC .............. *G06F 30/23* (2020.01); *G06F 30/17* (2020.01); *G06F 2111/10* (2020.01)

(58) Field of Classification Search
CPC .............. G06F 17/5018; G06F 17/5086; G06F 2217/16
USPC ........................................................... 703/2
See application file for complete search history.

(56) References Cited

PUBLICATIONS

Acharya_2012 (Finite Element Models for Thin-Walled Steel Member Connections, International Scholarly Research Network ISRN Civil Engineering vol. 2012, Article ID 197170, 7 pages).*
Adina_2012 (Theory and Modeling Guide vol. I: ADINA Report ARD 12—Dec. 8, 2012).*
Knight_2008 (Simulating the structural response of a preloaded bolted joint, in: 49th AIAA/ASME/ASCE/AHS/ASC Structures, Structural Dynamics, and Materials Conference, 2008, pp. 1-20).*
Kim_2007 (Finite Element Analysis and Modeling of Structure with Bolted Joints, Applied Mathematical Modeling 31 (2007) 895-911) (Year: 2007).*

(Continued)

*Primary Examiner* — Brian S Cook
(74) *Attorney, Agent, or Firm* — Thedford I. Hitaffer; Hitaffer & Hitaffer, PLLC (57) ABSTRACT

A simulation of real behaviour of a screw connection of metal components uses a finite elements method to determine suitable elements for building construction joints and their arrangement, and to determine their parameters, wherein the method uses models for simulation of contact between plates as well as shear load of a screw connection and axial load of the screw connection.

15 Claims, 5 Drawing Sheets

(56) References Cited

PUBLICATIONS

Knight_2008 (Simulating the structural response of a preloaded bolted joint, in: 49th AIAA/ASME/ASCE/AHS/ASC Structures, Structural Dynamics, and Materials Conference, 2008, pp. 1-20) (Year: 2008).*
Liu_2010 (A finite element based dynamic modeling method for design analysis of flexible multibody systems, Georgia Institute of Technology 2010). (Year: 2010).*
Acharya_2012 (Finite Element Models for Thin-Walled Steel Member Connections, International Scholarly Research Network ISRN Civil Engineering vol. 2012, Article ID 197170, 7 pages) (Year: 2012).*
Adina_2012 (Theory and Modeling Guide vol. I: ADINA Report ARD 12 —Dec. 8, 2012) (Year: 2012).*
Gu_2009 (Handling of Constraints in Finite-Element Response Sensitivity Analysis, DOI: 10.1061/(ASCE)EM.1943-7889. 0000053). (Year: 2009).*
Spountzakis_2009 (Nonlinear Dynamic Analysis of Timoshenko Beams by BEM. Part I: Theory and Numerical Implementation, Nonlinear Dyn (2009) 58: 295-306) (Year: 2009).*
Crivelli_1992 (A Three-Dimensional Nonlinear Timoshenko Beam Based on the Core-Congruential Formulation Report No. CU-CSSC-92-05 May 1992) (Year: 1992).*
Shi_2007 (Nonlinear Finte Element Modeling and Characterization of Guyed Towers Under Severe Loading, University of Missouri-Columbia Dec. 2007). (Year: 2007).*
N. Tanlak et al: 11 "Detailed and simplified models of bolted joints under impact loading", Journal of Strain Analysis for Engineering Design, vol. 46, No. 3, Apr. 2011 (Apr. 2011), pp. 213-225, XP055208554, ISSN: 0309-3247, DOI: 10.1177/0309324710396997, and abstract, section 4.6 & section 5; figures 3-13.
Gray P J et al: "A global bolted joint model for finite element analysis of load distributions in multi-bolt composite joints", Composites Part B: Engineering, Elsevier, UK, vol. 41, No. 4, Jun. 2010 (Jun. 2010), pp. 317-325, XP027030660, ISSN: 1359-8368 [retrieved on Mar. 11, 2010] abstract & sections 3.1-35; figures 2,4.
Sandesh R. Acharya et al: "Finite Element Models for Thin-Walled Steel Member Connections", ISRN Civil Engineering, vol. 123, No. 9, 2012, pp. 1-7, XP055208558, DOI: 10.1016/j.tws.2007.03.006, abstract & sections 4.1-4.2; figures 4,5.
Alexandra Korolija: "FE-modeling of bolted joints in structures—Master Thesis in Solid Mechanics", 2012, pp. 1-57, XP055208561, Retrieved from the Internet: URL:http://www.diva-portal.org/smash/get/diva2:550529/fulltext01 [retrieved on Aug. 19, 2015] section 2.5, 2.7; figures 19,20; table 1.

* cited by examiner

COMPUTER-IMPLEMENTED METHOD FOR SIMULATING BEHAVIOR OF A SCREW CONNECTION BETWEEN METAL COMPONENTS OF ENGINEERING STRUCTURES

FIELD OF THE INVENTION

The present invention relates to the simulation of real behaviour of screw connection of metal components using FEM finite elements method, to determine suitable parts of building structure joints and their arrangement, and to determine their parameters.

BACKGROUND OF THE INVENTION

In the design, development and construction in various fields of technology, modern computer technology allows using computer-implemented simulation to predict real behaviour in places, where practical verification is not possible or is not suitable for certain reasons, for example time or financial ones. An example is patent EP1257904 which discloses computer-implemented method of simulation of the effect of 1/f noise on electric circuit, or a method of simulation of sheet metal dressing using the finite elements method to determine the optimal pressure for metal forming using pressing moulds, described in patent application EP2423840. An example from construction industry might be a method of creating a model simulating an element comprising rods for reinforcement from the document KR100911167.

These simulations usually precede the physical production, for example making of a prototype, or production of the actual product as it is especially in building construction, where simulation usually precedes each new construction. Using these simulations may reduce development, testing and production costs, as well as it may increase reliability and quality of actual products this is the direct technical effect these inventions have. In case of building constructions, these effects include reducing of construction costs by saving material or the amount of components, reducing the time required for development and reducing or eliminating the need for tests. Another significant advantage is providing greater safety of constructions and reducing the risk of structural defects.

Metal supporting structures are important part of buildings, bridges, storage facilities and other building structures. For technological reasons the elements of metal supporting structures are beam ones. Beam element is designed as a rod having a certain cross-section. When designing the supporting structure, the construction engineer has to design the structure so as to transfer the load having effect on the construction. According to the state of the art, this is achieved by assembling a beam model of the whole construction usually using the finite elements method. This is apparent to the person skilled in the art, for example from the following literature: K. J. Bathe, *Finite Element Procedures*, Prentice-Hall, New Jersey, 1996 or O. C. Zienkiewicz, R. L. Taylor, *The Finite Element Method for Solid and Structural Mechanics*, Sixth edition, Elsevier Butterworth-Heinemann, Oxford, 2005, the beam elements are designed as one-dimensional, thus as linear finite elements. The places in which the beam elements are connected are called joints and are simulated in the beam model by mesh nodes. After assembling such model, translation and rotational deformations of the joints are mathematically simulated and consequently also stress and internal forces in the beam of the construction resulting from them. On the basis of this simulation, the required cross-sectional dimensions of the beam elements are determined.

Consequently, the construction engineer designs and verifies the safety of the joints. Usually more beam elements are attached to the joint. The joint by means of which the construction is connected with the base or other construction is an exception. In such case, only one beam element can be attached to it. Node load which has an effect on the joint becomes apparent from the beam model. It is necessary to sort out the transfer of node load, mutual interconnection of the beam elements, their collisions and interaction. The joint therefore represents a relatively complex subsystem and safety of the whole construction usually depends on its proper design. The beam model itself does not provide a suitable solution for the design of the joint. The linear finite beam elements are not able to affect the actual behaviour of the joint.

The joints of metal constructions are, according to the state of the art, designed using proposed methods based on samples which are derived only for selected types of joints and selected types of stress as it is stated for example in ČSN EN 1993-1-8: Eurocode 3: Design of steel structures—Part 1-8: Design of joints. To simulate the behaviour of any optional or atypical joint, it is necessary to design a more accurate beam model which would comprise the effect of all included elements, such as particular beam elements, for example various supports and their connections by welding seams or screws.

This can by theoretically realized using the complete volume finite elements model, which is computationally demanding and time-consuming and thus not practically possible for structures comprising a number of interconnected elements.

Another possibility is its simplification into two-dimensional shell finite elements, which would be interconnected with mesh nodes of finite elements which would be mutual for several elements. Alternatively, it is possible to use multipoint constraints that would secure the transfer of parameters from the mesh node of one element to the mesh node of another element without their actual interconnection by mutual mesh nodes, as it is described in detail in the literature stated above and also mentioned in the examples of invention embodiments. Neither one of the said methods is able to properly design a number of screw connections characterized by many complex non-linear properties. However, exactly the screw connections are most commonly used in metal building constructions.

SUMMARY OF THE INVENTION

The said drawbacks are eliminated by a computer-implemented method of simulation of real behaviour of screw connection in metal components of building construction comprising replacement of metal components of building construction with shell elements plates which are simpler in shape and designed using the finite elements method so as the plates comprise a number of elements connected together with mesh nodes, wherein the first plate comprising at least two first mesh nodes and the second plate comprising at least two second mesh nodes are included, according to the present invention characterized in that the method further comprises a model for simulation of shear load of screw connection and a model for simulation of axial load of screw connection, for transfer of load of force and deformation from the first mesh nodes to second mesh nodes, wherein the model for simulation of shear load of screw connection is non-linear. Other advantages of the present invention will become apparent after careful reading of the examples of invention embodiments with references to the respective figures.

DESCRIPTION OF THE PREFERRED EMBODIMENTS

Figure 1:
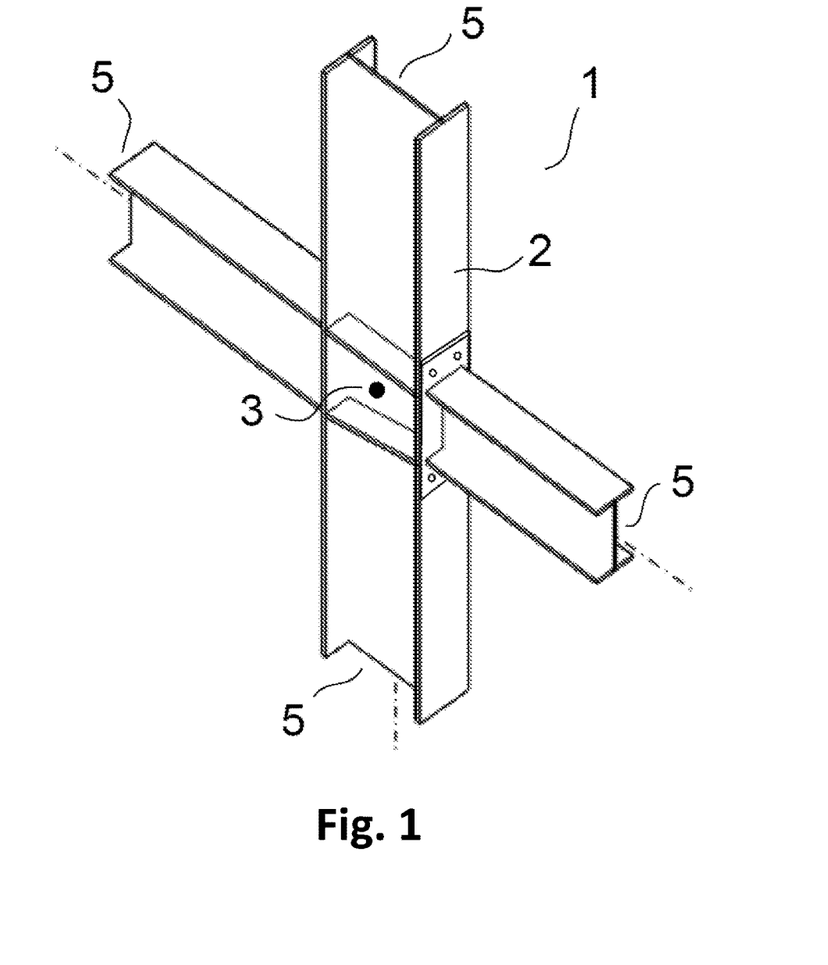
FIG. 1 is an example of a joint
Figure 2:
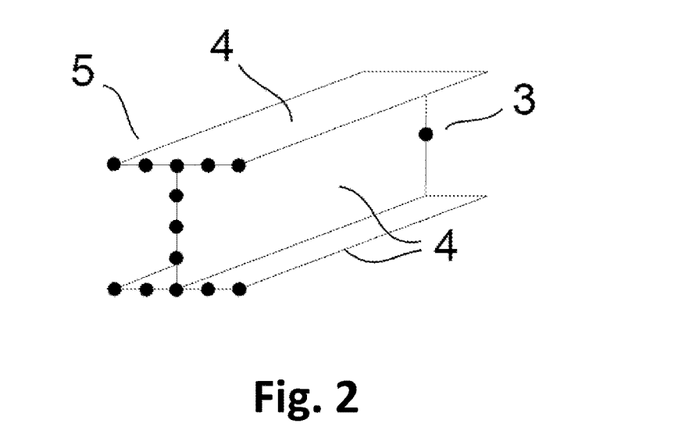
FIG. 2 is an example of a short segment of beam element

Computer-implemented method of simulation of real behaviour of screw connection of metal components in building construction according to the present invention results from the fact that a joint 1 with parts where the beam elements 2 are attached will be removed from the beam model of the whole construction, as it is shown in the FIG. 1. Only in case of its connection to the base or other construction may the joint 1 comprise, besides other components, only one beam element 2. Among the particular connected beam elements 2 only short segments will be introduced into the model, for example those with length of two or free heights of their cross-section. Each segment adopts the direction, cross-section and the load of the general model. The overall load on the joint 1 creates an equilibrium model of forces and moments. The forces calculated in the place where the beam elements 2 are attached, thus in the place of mesh node 3 of the beam model of the whole construction, will be used for the load of particular segments. A beam model of the segment will be constructed from the plates 4 of the two-dimensional shell elements using the finite elements method, according to the cross-section shape and centreline of the segment represented by a straight line running through the centre of gravity of its cross-section. To capture the proper behaviour of the joint it is necessary to transfer the forces calculated in the mesh node 3 of the beam model to the end cross sections 5 of the segments on the other side of the centre of the joint. This is done by putting the load on that mesh node 3 of the beam model, where these forces are known, and connecting it using the force multipoint constrain with all mesh nodes on the edges of plates 4 of the segment on its end cross section 5 what is also illustrated in the FIG. 2.

Multi Point Constraints are used for mutual connection of more mesh nodes of finite elements. Based on the locations of the mesh nodes and knowledge of interpolation deformation on the finite element mesh, it is possible to determine kinematic relations of the mutual node deformation. These dependencies can be represented by a linear system of equations.

$$B \cdot u = p$$

Where B is a matrix of kinematic relations between nodes and u is a vector of mesh node deformation. These redundant equations will be comprised in energy functional of the finite elements model using Lagrange multiplier method $\lambda$.

$$\prod = \frac{1}{2} u^T K \cdot u + u^T \cdot F + \lambda^T (B \cdot u - p)$$

Where K is system stiffness matrix and F is the vector of external load. By minimizing functional an $\delta\Pi=0$, the resulting deformations u will be found. These details are, of course, known to those skilled in the art.

In the general beam model in which the connection is realized by means of mesh node, the particular segments mutually collide and interfere. In creating the joint model it is therefore necessary to cut respective plates 4 according to the actual shape of the joint 1. Besides the beam elements 2, also other components are connected to the joint 1 for construction and production reasons, such as front plates, base plates and metal sheets for connection of truss elements, further lateral and longitudinal supports or ribs. These components will also be comprised in the beam model and replaced with two-dimensional plates 4. Each plate consists of the mesh of quadrilateral or triangular elements, of which the vertices meet in nodes 3.

Particular plates 4 of the segments as well as additional metal sheets are connected in the actual structure. This can be realized for example by permanent connections in the form of welds or partly dismountable connections in the form of anchor screws. In relation to the known methods which satisfactorily deal with the welds and anchor screws, only the model of screw connection of the metal components will be further described in detail.

According to the present invention, the plates 4 are not interconnected, which means that no mesh nodes 3 are mutual. While creating the beam model it is then necessary to create a model of screw connection between plates 4. The screw connection is divided into three parts, thus into two connections of plate 4 with screw model and the model itself.

Figure 3:
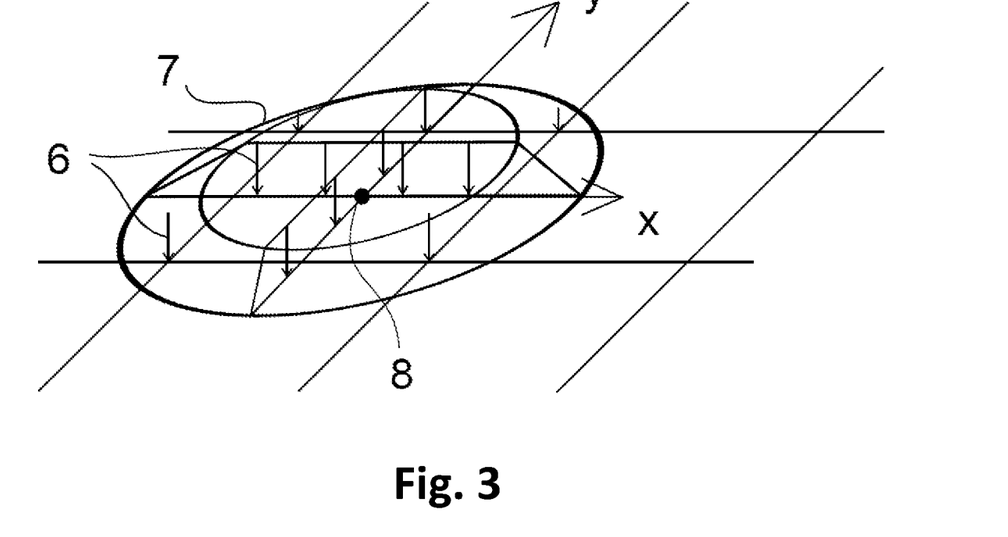
FIG. 3 illustrates a simulation of the load transfer from the screw to the plate

When modelling the transfer of the load from the screw to the plate 4 it is assumed that the load transferred by the screw is not being transferred in a certain point, but in a certain area. This can be modelled as an equivalent continuous load 6 p(x,y) on a certain area 7 A corresponding to the size of the screw head or screw plate, as it is shown in the FIG. 3. Result force of this continuous load is equivalent to the load being transferred via the screw. This can be written as:

$$F_S = \int\int_A p(x, y) \cdot dA$$

At the same time, the moment equilibrium must apply to the continuous load 6. If the origin 8 of the plate coordinate system x,y is located in the place of connection, then it has to apply that:

$$0 = \int\int_A x \cdot p(x, y) \cdot dA, \quad 0 = \int\int_A y \cdot p(x, y) \cdot dA$$

The continuous load 6 is divided into mesh nodes into substitute load $F_{Ni}$ using base functions Ni(x,y) of the finite elements.

$$F_{Ni} = \int\int_A N_i(x, y) \cdot p(x, y) \cdot dA$$

If we introduce the assumption that continuous load 6 is a linear multiple of the overall load $F_S$ and shape function g(x,y) describing the shape of the continuous load $$p(x,y)=F_S \cdot g(x,y)$$

then it applies that:

$$F_{Ni} = F_S \cdot \int\int_A N_i(x, y) \cdot g(x, y) \cdot dA = F_S \cdot B_i$$

The calculation of the load from the screw into mesh can be written in matrix.

$$F_N = B^T \cdot F_S$$

Lagrange multipliers are preferably used in the further process. Firstly, the energy of the forces in this connection is determined. Than a deformation coordinate representing the deformation in the place of screw connection $u_s$ is introduced. In equation, u represents vector of deformation in board mesh nodes. Further it applies that:

$$E=F_S(B \cdot u - u_s)$$

The energy is added to the energy functional of the finite elements.

$$\prod = \frac{1}{2} u^T K \cdot u + u^T \cdot F + F_S(B \cdot u - u_s)$$

Where K is the system stiffness matrix and F is the vector of external loads. The deformation values u will be found by minimizing the functional. The condition of functional minimum is met only provided that:

$$B \cdot u = u_s$$

This is the relation between point deformation in screw connection and deformation of the board mesh nodes.

When calculating $B_i$ it is necessary to calculate following integral:

$$B_i = \int\int_A N_i(x, y) \cdot g(x, y) \cdot dA$$

After obtaining the transcript of the deformation in the point of screw connection into plate 4 it can be proceeded to the screw model itself. In relation to the screw it is distinguished between axial load of screw connection and shear load of screw connection. For each of these loads we define dependence between relative deformations in the point of screw connection and load components transferred by a screw.

Figure 4:
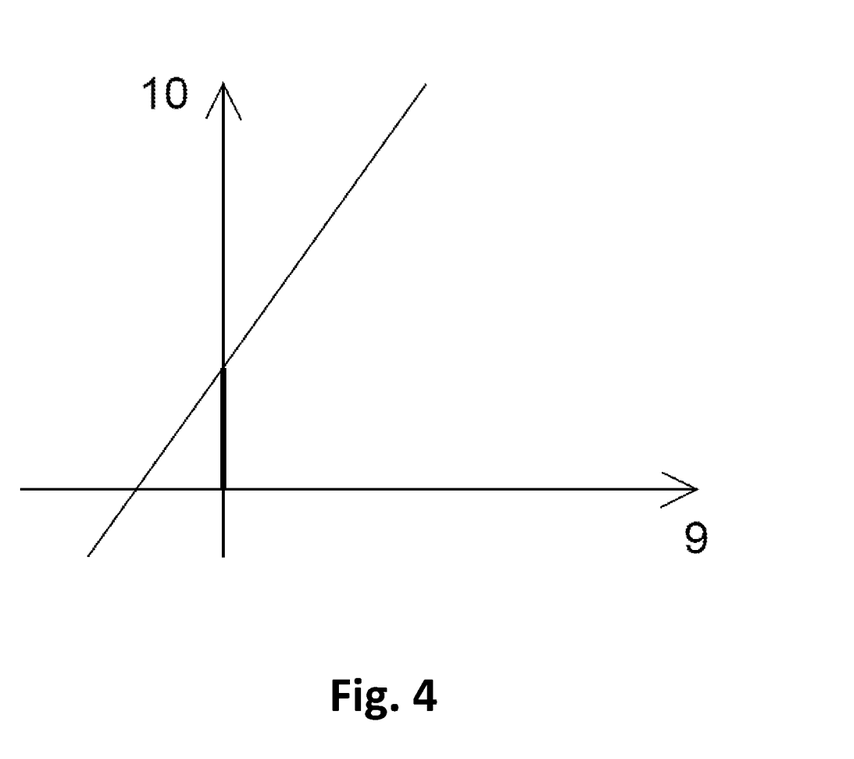
FIG. 4 is an example of the process of deformation and load on preloaded connection
Figure 5:
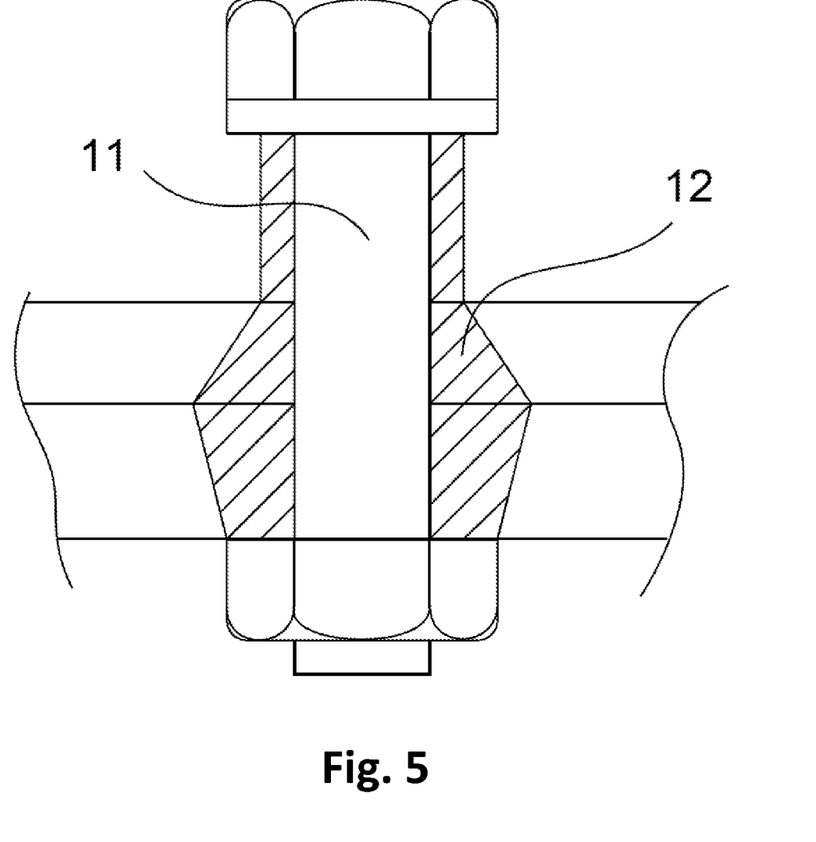
FIG. 5 illustrates axial load of screw connection

Axial load of screw connection is considered to be elastoplastic. Many screw connections are preloaded in practice due to the more favourable behaviour of preloaded screws, as it is shown in the FIG. 4 illustrating the process of deformation 9 and force 10. It is necessary to determine the correct screw connection stiffness in the model. Axial screw stiffness results from the material properties and proportions of the screw. As it is apparent from the FIG. 5, the screw connection consists of the route of tension consisting of the screw 11 itself and a pressure route consisting of the deformation cone 12. Based on proportions and material properties, it is possible to directly determine the stiffness in route of tension and stiffness in pressure route.

Shear load of the screw connection is transferred by two mechanisms. Either through friction between boards 4 in preloaded connection or through the screw. In the first case, the simulation model for shear load of the screw connection is not usually included in the general model, even though it is possible to use a combination of both of these models.

The model for simulation of contact between plates 4 results, in some cases, from providing mesh coincidence, or in other words, a state in which mesh nodes of both plates 4 face each other. In such case, only a contact of two nodes is taken into consideration. In other cases, the meshes of plates 4 are in different positions. Then the model is designed with penetrating planes, and the problem with the contact of two planes leads to the problem of contact of two nodes in terms of finite elements method, as it is apparent for person skilled in the art. In all cases, the principle of providing connections is the same. If penetration g of contact planes occurs, it is necessary to implement contact force $\lambda_k$ into these nodes, so as to minimize the penetration g to an acceptable value. Contact problems are non-linear and in terms of finite elements method they are solved using iterative methods. One of the three basic iterative methods is the so called penalisation. If penetration occurs, then high penalisation stiffness k is introduced between the contact nodes which will produce a contact force between nodes.

$$\begin{bmatrix} k & -k \\ -k & k \end{bmatrix} \begin{bmatrix} dx_m \\ dx_c \end{bmatrix} = \begin{bmatrix} -kg \\ kg \end{bmatrix}$$

Another iterative method is using Lagrange multiplier. If penetration occurs, kinematic constraint will be set between contact nodes, which will bind their movement like movement of a solid object. Here, Lagrange multipliers will be used by introducing another unknown parameter $\lambda_k$ which represents the contact force. Following iteration minimizes the penetration g to zero.

$$\begin{bmatrix} 0 & 0 & 1 \\ 0 & 0 & -1 \\ 1 & -1 & 0 \end{bmatrix} \begin{bmatrix} dx_m \\ dx_c \\ d\lambda \end{bmatrix} = \begin{bmatrix} -\lambda \\ \lambda \\ g \end{bmatrix}$$

The final iterative method is an extended Lagrange multiplier which combines the advantages of both of above stated methods. It does not introduce another unknown parameter $\lambda_k$ into the system but still minimizes penetration g to zero. A penalisation stiffness k will be used in a different iteration.

$$\begin{bmatrix} k & -k \\ -k & k \end{bmatrix} \begin{bmatrix} dx_m \\ dx_c \end{bmatrix} = \begin{bmatrix} -\lambda - kg \\ \lambda + kg \end{bmatrix}$$

Following value $\lambda_k$ for next iteration step will be calculated as follows:

$$\lambda^{k+1} = \lambda^k + kg$$

In the second case, the shear load is transferred through the screw. The model of shear load of screw connection will be divided into three linearly lined subsystems—the subsystem of bearing load in the FIG. 6 which is comprised twice to simulate interaction with each of the two plates and subsystem of shear deformation of screw in the FIG. 7. In case of connecting a larger amount of plates 4 more subsystems of bearing load will be included. These subsystems are generally determined by proportions and material properties of the screws and plates.

Figure 6:
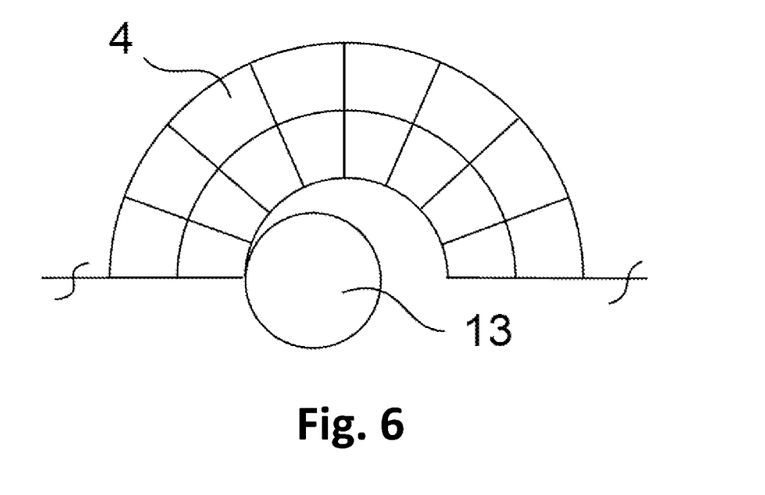
FIG. 6 illustrates a subsystem of shaft penetration to the plate

The model of bearing load is shown in detail in the FIG. 6, where local penetration of the shaft to the plate is apparent. In this model, the screw shaft 13 is simulated as a solid contact element and plate 4 is modelled using elements for plane stress. Material of plate 4 is considered to be idealplastic. By solving such model, the nonlinear dependence of deformation 9 on force 10 will be found.

Figure 7:
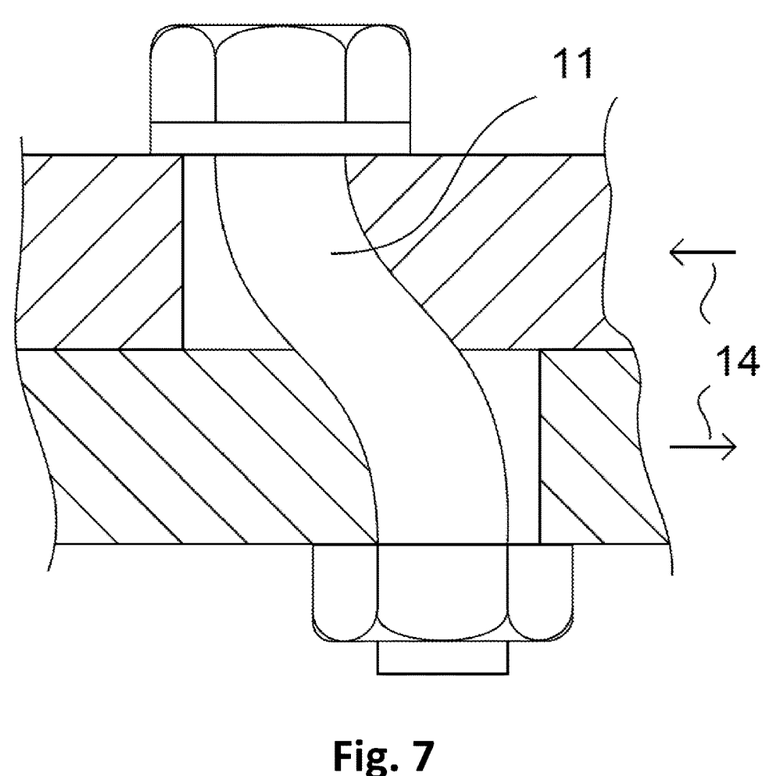
FIG. 7 illustrates shear load of screw connection

The model of shear deformation of screw connection is given by a combination of bending and shear load, as it is shown in the FIG. 7. Based on the knowledge of screw proportions and its material properties and the process of shear force 14 and the torque we will also determine the dependence of deformation 9 on force 10 of the screw as nonlinear.

Figure 8:
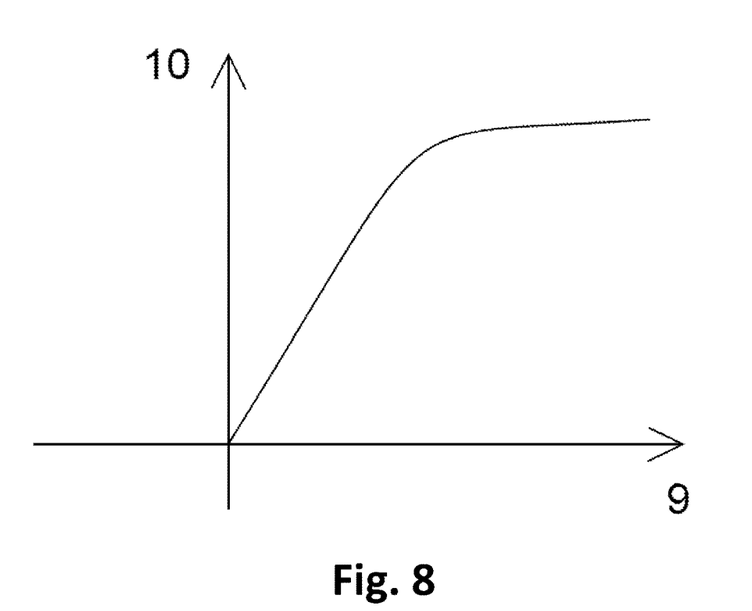
FIG. 8 is an example of resulting non-linear dependence of deformation on the force in shear model

The overall shear characteristic will be determined as an overall characteristic of the three series-connected nonlinear subsystems, two of which represent models of penetration of the shaft to the plate and one represents the model of shear deformation of screw connection. In the FIG. 8, an example of such resulting nonlinear dependence of deformation 9 on force 10 is shown.

Model for simulation of shear load of screw connection, model for simulation of axial load of screw connection and model for simulation of the contact between plates can be realized using one general model, or they can be divided into a number of partial models dealing with particular physical effects of their parts.

After creating a calculation model using above stated method, a standard nonlinear calculation via finite elements method will be done, which is very fast thanks to the above stated method. The result is the translational and rotational deformation in all mesh nodes. From it the stresses in all metal components are calculated, further for example the stress in weld seams, forces in screws and anchor screws and a contact stress between plates and concrete anchor structures. These results will be further used for example for safe design of dimensions of particular plates, welds and screws.

Figure 9:
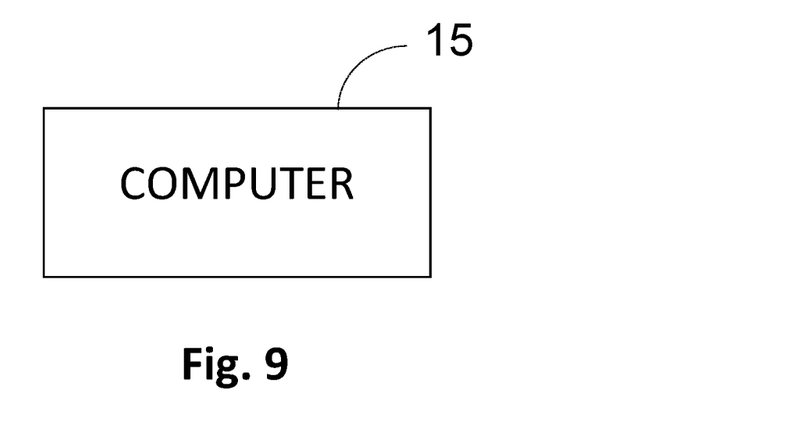
FIG. 9 is a diagram of a computer implementing the method according to the invention

Of course, the method of the invention is implemented by a computer 15, which is shown in FIG. 9.

LIST OF REFERENCE SIGNS 1 joint
2 beam element
3 mesh node
4 plate
5 end cross section
6 continuous load
7 area under screw head or screw pad
8 coordinate system origin
9 deformation
10 force
11 screw
12 deformation cone
13 screw shaft
14 shear force
15 Computer

The invention claimed is:

1. A computer-implemented method of simulating predictable behavior of a screw connection of metal components in building structures, screw connection comprising at least a screw and first and second metal components, the method comprising the steps of:
   a) simulating the first and second metal components of a building structure,
   b) replacing the first and second metal components with at least first and second simulated plates of shell components modeled by a finite-element method, wherein the plates comprise a number of elements interconnected by the mesh nodes, wherein
      the first plate comprises at least two first nodes, and
      the second plate comprises a at least two second nodes,
   c) connecting the first and second plates with a screw model, including connections comprising:
      a first connection of the first plate comprising the step of transferring a first load from the first nodes to only a single first point, and
      a second connection of the second plate comprising the step of transferring a second load from the second nodes to only a single second point, and
      wherein the screw model is between the first point and the second point, the screw model comprising:
         a model simulating shear load of the screw connection, and
         a model simulating axial load of the screw connection,
      wherein the models of simulating shear and axial load simulate transfer of force and deformation load from the first point to the second point, and wherein the model simulating shear load of the screw connection comprises a subsystem simulating interaction of the screw with each one of the first and second metal components and a subsystem of shear deformation of the screw, and wherein the model simulating shear load is nonlinear,
   d) determining the predictive behavior of the screw connection based on the simulated transfer of force and deformation load, and
   e) using the predictable behavior to determine suitable metal components and screw connections in building structures.

2. The method of claim 1, wherein the model for simulation of shear load comprises a mathematical model of plastic behavior of a screw under shear load.

3. The method of claim 1, wherein the model for simulation of axial load comprises a mathematical model of one or more physical effects including a screw deformation constant, a plate deformation constant and a preload of the screw connection.

4. The method of claim 1, wherein transfer of load from the nodes to the points comprises a continuous load on a screw head or a screw pad area that corresponds to a size of the screw head or a screw pad that is calculated by which a force constraint between the nodes and the points is obtained.

5. A computer-implemented method of simulating predictable behavior of a screw connection of beam elements in a building structure, screw connection comprising at least a screw and first and second beam elements the method comprising the steps of:
   a) simulating a joint comprising a first beam element segment and a second beam element segment interconnected by a screw connection, b) replacing the first and second beam element segments of the joint with at least first and second simulated plates of two-dimensional shell elements using a finite-element method, wherein the plates comprise a number of elements interconnected by mesh nodes of finite elements, wherein
the first plate comprises at least two first nodes, and the second plate comprises at least two second nodes,
c) connecting the first and second plates with a screw model, including connections comprising:
a first connection of the first plate comprising the step of transferring a simulated first load from the first nodes to only a single first point, and
a second connection of the second plate comprising the step of transferring a simulated second load from the second nodes to only a single second point, and
wherein the screw model is between the first point and the second point, the screw model comprising:
a model simulating shear load of the screw connection, and
a model simulating axial load of the screw connection, wherein the models of simulating shear and axial load simulate transfer of force and deformation load from the first point to the second point, and wherein the model simulating shear load of the screw connection is nonlinear,
d) determining the predictive behavior of the screw connection based on the simulated transfer of force and deformation load, and
e) using the predictable behavior to determine suitable beam elements and screw connections in building structures.

6. The method of claim 5, wherein the beam elements are metal components of metal building construction.

7. The method of claim 5, wherein the plates have a shape corresponding to shapes of the first and second beam element segments.

8. The method of claim 5, wherein the simulated transfer of force from the first point to the second point is at a center of the screw connection.

9. The method of claim 8, wherein an equilibrium model of forces and moments is created based on an overall load on the joint.

10. The method of claim 5, wherein first and second plates have mesh nodes on the edges of plates which corresponds to end cross section of the beam element segments, wherein a load is applied to the mesh nodes on the edges of plates using a force multipoint constraint.

11. The method of claim 5, wherein the model simulating shear load of the screw connections is divided into subsystems, comprising subsystems simulating interaction of the screw with each of the first and second beam elements and a subsystem of shear deformation of the screw in the screw connection.

12. The method of claim 11, wherein the subsystems are determined based on proportions and material properties of the first and second beam elements and the screw.

13. The method of claim 5, wherein the model for simulation of shear load comprises a mathematical model of plastic behavior of a screw under shear load.

14. The method of claim 5, wherein the model for simulation of axial load comprises a mathematical model of one or more physical effects including a screw deformation constant and a preload of the screw connection.

15. The method of claim 5, wherein transfer of load from the nodes to the first and second points comprises a continuous load on a screw head or a screw pad area that corresponds to a size of the screw head or a screw pad that is calculated by which a force constraint between the nodes and points is obtained.

\* \* \* \* \*